United States Patent [19]

von Bonin et al.

[11] Patent Number: 5,258,216

[45] Date of Patent: Nov. 2, 1993

[54] SHEET-LIKE STRUCTURES CAPABLE OF INTUMESCENCE, THEIR PRODUCTION

[75] Inventors: Wulf von Bonin, Odenthal; Ulrich von Gizycki, Leverkusen, both of Fed. Rep. of Germany

[73] Assignee: Bayer Aktiengesellschaft, Leverkusen, Fed. Rep. of Germany

[21] Appl. No.: 23,461

[22] Filed: Feb. 25, 1993

Related U.S. Application Data

[63] Continuation of Ser. No. 798,472, Nov. 26, 1991, abandoned.

[30] Foreign Application Priority Data

Dec. 22, 1990 [DE] Fed. Rep. of Germany ....... 4041470

[51] Int. Cl.⁵ .................... B32B 3/06; B32B 5/06; C09K 21/14
[52] U.S. Cl. ................... 428/102; 428/234; 428/240; 428/241; 428/242; 428/244; 428/298; 428/313.3; 428/313.7; 428/313.9; 523/179
[58] Field of Search .............. 428/102, 234, 240, 241, 428/242, 244, 298, 313.3, 313.7, 313.9; 523/179

[56] References Cited

U.S. PATENT DOCUMENTS

| | | | |
|---|---|---|---|
| 4,250,172 | 2/1981 | Mutzenberg et al. | 428/244 |
| 4,372,997 | 2/1983 | Fritze et al. | 428/144 |
| 4,713,283 | 12/1987 | Cogswell et al. | 428/244 |
| 4,801,496 | 1/1989 | Buchacher | 428/313.9 |

FOREIGN PATENT DOCUMENTS

| | | |
|---|---|---|
| 0023764 | 2/1981 | European Pat. Off. |
| 1310355 | 3/1973 | United Kingdom |
| 1582158 | 12/1980 | United Kingdom |

*Primary Examiner*—George F. Lesmes
*Assistant Examiner*—Kathryne Elaine Shelborne
*Attorney, Agent, or Firm*—Sprung Horn Kramer & Woods

[57] ABSTRACT

New sheet-like structures which are capable of intumescence contain a layer of granular intumescence material between two textile sheet-like structures which are stitched or sewn to one another.

1 Claim, No Drawings

SHEET-LIKE STRUCTURES CAPABLE OF INTUMESCENCE, THEIR PRODUCTION

This application is a continuation of application Ser. No. 798,472, filed Nov. 26, 1991, now abandoned.

Sheet-like structures which are capable of intumescence, that is to say capable of thermal expansion, and if appropriate are flexible are of interest for the purpose of fire protection and for the production of construction elements.

It is known that structures which are capable of intumescence can be produced by coating textiles with intumescence materials. However, these have the disadvantage that because of the often low flexibility of the coatings, these break and crumble, and that intumescence active compounds can be employed for the production of such structures only with a binder and often also with a solvent, which is frequently undesirable.

Sheet-like structures which are capable of intumescence have now been found, which are characterised in that they contain a layer of a granular intumescence agent between two textile sheet-like structures which are stitched or sewn to one another.

A process has also been found for the production of optionally flexible intumescing sheet-like structures without using solvents or binders, which also leads to sheet-like structures having good mechanical properties and is suitable in principle for all solids which intumesce.

The process according to the invention for the production of sheet-like structures which are capable of intumescence is characterised in that a layer of a granular intumescence agent is applied to a textile sheet-like structure, a second textile sheet-like structure is applied to this coating and the two sheet-like structures are then stitched or sewn to one another. A type of sandwich structure with a central layer which is capable of intumescence is thus formed.

Embodiments of the present invention in which at least one of the textile sheet-like structures is a non-woven of cellulosic material and expandable graphite or formulations containing expandable graphite have been used as the granular intumescence agent are of particular interest.

Glass fibres and/or mineral fibres can advantageously be integrated into the sheet-like structures according to the invention which are capable of intumescence, for example as a constituent of the textile sheet-like structures or as an additional layer in woven or non-woven form or as a loose concomitant substance in the layer of granular intumescence material.

Surprisingly, sheet-like structures according to the invention can be highly flexible and mechanically resistant, even if the intumescence material itself is rigid and crystalline. This is present in the finished product in an outstandingly fixed state, even if it has been employed in powder form or as granules. A particularly good fixing is obtained if non-wovens are employed as the textile sheet-like structures and these are joined to one another by stitching.

It is furthermore surprising that the stitching process also results in advantageous products with thick layers of the intumescence agent, in particular expandable graphite, the needles undergoing no damage even if the intumescence agent is employed in the form of relatively large particles, for example particles having a diameter of 0.3–3 mm.

Possible textile sheet-like structures are, preferably, stitchable woven fabrics, knitted fabrics, loop fabrics, laid fabrics and in particular non-wovens. If products according to the invention are to be obtained by sewing, films and layers of foam can also be considered instead of the textile sheet-like structures. It is preferable to use textile sheet-like structures and to stitch these. Multiple stitching can also be carried out, it being possible for the sandwich structure formed to be doubled once or several times, if appropriate.

The textile sheet-like structures, preferably non-wovens, to be employed as the starting material can have, for example, weights per unit area of 20 to 600 g/m$^2$ or more, preferably 50 to 250 g/m$^2$. They are preferably prestitched or if appropriate compacted by a binder. A prestitched non-woven can be handled more effectively and is therefore preferred. The fibre length (staple length) in the non-woven can be, for example, at least 5 mm, preferably more than 20 mm.

Possible fibre materials for the textile sheet-like structures are, preferably, cellulosic fibres, if appropriate together with mineral fibres, or even mineral fibres as such. Other examples of the fibre material for the textile sheet-like structures are: wood (mechanical wood pulp), viscose staple fibres, viscose fibres and cellulose ester fibres, cotton, hemp, jute, sisal, coconut fibres, paper pulp, waste paper pulp, asbestos, customary glass fibres, extra fine glass fibres, rock wool, kaolin fibres, aluminium oxide fibres, carbon fibres, metal fibres and fibres and extra fine fibres based on aliphatic, araliphatic or aromatic, organic polymeric compounds, such as polyolefins, polydiolefins, polyamides, polyimides, polyvinyl alcohols, polyacrylates, poly(meth)acrylates, polyacrylonitriles and oxidation and/or pyrolysis products thereof, polyesters, polyethers, polyurethanes, polyureas, polysiloxanes, polyphosphazenes, proteins and polycarbodiimides.

Mixtures of various fibres can of course also be present in the textile sheet-like structures.

Metal fibres, for example those of steel, high-grade steel, copper and/or silver, are also possible, preferably as a fibre mixture component.

The textile sheet-like structures to be employed can be identical or different.

In the production process according to the invention for sheet-like structures which are capable of intumescence a procedure can be followed in which a dry layer, which can be sprinkled or is free-flowing, of an intumescence agent is preferably applied to an initial textile sheet-like structure, preferably a prestitched cellulose or cotton non-woven, which also additionally contains mineral fibres if appropriate. The intumescence agent can also be a mixture of different intumescence agents, an intumescence agent formulation or an intumescence formulation. Although application from a liquid phase, for example from an aqueous dispersion, or as a pasty formulation is possible, this is not preferred, since solvent-free working with intumescence material which can be sprinkled is technologically advantageous. Other fibrous structures, for example layers of mineral fibres, mineral fibre non-wovens, glass fabric or strands of carbon fibres, can also additionally be placed on the material or incorporated, if appropriate, before, during or after application of the intumescence agent.

Preferred intumescence agents are graphites which are capable of thermal expansion or formulations containing these. Such graphites can have, for example, particle diameters of 0.1 to 5, preferably 0.4 to 3 mm.

They are so-called intercalation compounds of graphite or so-called graphite salts. Those expandable graphites which are obtainable by treatment of graphites with nitric acid and/or sulphuric acid, if appropriate in fuming form, and if appropriate together with $H_2O_2$, and contain water, $NO_x$ and/or $SO_x$ as the blowing agent, are preferably used. Such graphites can be employed in the form in which they are formed, but also in neutralised form, for example neutralised with alkalis, ammonia or amines.

The expansion process of such expandable graphites, which can lead to volume increases of more than 100%, starts from about 180° C. and has in general ended at about 600° C. However, the present invention no longer relates to the complete expansion of the expandable graphite or of other intumescence agents.

If appropriate, the expandable graphites can also be employed together with other intumescence materials or with glass flakes, powders or fibres or other minerals, or in a form coated with a binder.

Examples of intumescence agents other than expandable graphites are micas which expand at temperatures up to 900° C., preferably up to 600° C., such as perlites, vermiculites or expandable borosilicates, aluminates, water-glass gels, water-containing alkali metal silicates and addition products of ammonia or amines on acid aluminium phosphates, it also being possible, for example, for the latter to be used as the binder or coating agent for expandable graphite. Other intumescence agents can be, for example: ammonium and amine phosphates, ammonium and amine polyphosphates, such its phosphates or polyphosphonates of ethylenediamine and ammonia, of melamine or of urea and its condensation products or combinations which, in addition to carbohydrates or pentaerythritol and/or condensation products thereof and/or melamine, contain urea, dicyandiamide and/or methylol compounds thereof and if appropriate additionally also ammonium phosphates and are known in principle as intumescence mixtures. Expandable cork powder, expandable cereal grains, starch formulations and bark powder, if appropriate together with ammonium phosphate, are also possible, or powder of expandable polyurethane, such as are described, for example, in DE-A 3,302,416 and 3,302,417.

In addition to expandable graphites, expandable silicates which contain water and/or split off water are of particular interest for the present invention.

In principle, all the granular intumescence materials which are capable of being sprinkled can be used. The particle sizes (average diameter) can be, . for example, 0.05 to 5 mm, preferably 0.3 to 3 mm.

The intumescence agents can be applied to the textile sheet-like structure, for example, in an amount of 10 to 5,000 g/m² or more, preferably 50 to 1,000 g/m². They can be applied with a uniform layer thickness, but also in the form of stripes or a pattern. Certain part areas can remain non-sprinkled or be sprinkled with an increased amount of material. A procedure can then be followed in which a second web, which can preferably be stitched, of textile material is placed on the granular layer of intumescence material and the sandwich thus formed is sewn or preferably stitched. The stitching units which are customary for processing non-wovens and have the most diverse customary needle shapes, numbers, densities and arrangements are suitable for the stitching. The two textile sheet-like structures are preferably stitched through. However, only partial penetration of the needles into the textile sheet-like structure lying underneath is also possible.

As a result of the single or repeated stitching which is preferably carried out over the entire surface, but if appropriate also over a part surface in the form of a pattern, the sandwich formed is compacted and the intumescence material present in the sandwich as the internal layer is bound in the sandwich so that it usually trickles out only insignificantly, even at fresh cut edges.

Although it is possible for optionally thermoplastic or reactive binders also to be used, this is not preferred.

The sandwich thus prepared (=sheet-like structure according to the invention which is capable of intumescence) can then be used or after-treated either directly or after suitable cutting. The after-treatment can be, for example, a biocidal, hydrophobic or oleophobic treatment, as well as colouring or printing. It is advantageous for the freshly stitched sheet-like structure also to be ironed or flattened, if appropriate with steam being supplied, it being possible for temperatures of up to 200° C., preferably 80° to 150° C., and pressures of, for example, up to 50 kg/cm² or more, preferably 1 to 5 kg/cm², to be used. During such ironing or flattening, it should be ensured that the intumescence agent in the sandwich expands only partly, if at all.

In special cases, the sheet-like structure according to the invention can be after-treated by brief heating to temperatures of, for example, between 150° C. and 300° C., for example in a press, so that a certain expansion of its internal layer already occurs at this process stage, that is to say before the sheet-like structure which is capable of intumescence is used as intended. This expansion can lead to stiffening of the material and/or to an even better binding of the intumescence materials and to a reduction in specific gravity. In the case of expandable graphite, a certain felting of the now partly expanded expandable graphite particles embedded in the structure also occurs, which further improves the binding of the expandable graphite particles to one another and to the total sheet-like structure without substantially limiting the flexibility thereof.

Sheet-like structures according to the invention which are capable of intumescence can also be produced in the form of several layers and/or stitched or sewn in the form of several layers. They can be passed to other coating and impregnating processes, for example in order to be even further compacted on one or both sides over the entire area or in the form of a pattern, rendered waterproof, provided with adhesive layers or strengthened or protected against mechanical stresses. They can also be used for the production of so-called prepregs, that is to say synthetic resin impregnates, which can be stored for minutes, days or months and can be hardened by heating, for example to 80° to 600° C., preferably 100° to 300° C., if appropriate while shaping.

The hardening reaction of the synthetic resin here can be combined, if appropriate, with the expansion of the sheet-like structure according to the invention serving as the base, by which procedure fibre-reinforced light-weight mouldings can be produced.

Possible synthetic resins are, in addition to thermoplastics, such as polyolefins, polyvinyl aromatics, polyvinyl esters, polyacrylates, polyamides, polyesters, polyurethanes, polycarbonates and polyethers, also the customary thermosetting resins, for example unsaturated polyester resins, aminoplast resins, phenolic resins, epoxy resins, polyisocyanates, polyisocyanates in combination with polyols and/or epoxides, melamine resins, cyanate resins and polyamide resins.

Sheet-like structures according to the invention which are capable of intumescence and contain covering layers of thermoplastic material can also be used for the production of sandwich-like lightweight shaped articles by allowing the intumescence agent contained in the sheet-like structures according to the invention to expand at temperatures in the range from 200° to 2000° C., preferably 300° to 900° C., while shaping. Such sandwich-like lightweight shaped articles, their production and their use form the subject matter of their own earlier patent application.

It is also possible for sheet-like structures according to the invention, the covering layers of which consist of non-thermoplastic material, to be heated in moulds up to, for example, 180° to 900° C., preferably also 200° to 600° C., to allow the intumescence agent to expand. The sheet-like structures according to the invention which are capable of intumescence can be cut in the desired manner beforehand and if appropriate also be introduced into the mould in several layers, if appropriate also in the form of windings around a mould core. During expansion, the mould, usually a metal mould of steel or aluminium, but also a ceramic mould, is then filled by the intumescence foam formed, so that a lightweight shaped article results, the surfaces of which are formed by the pyrolysis product of the sheet-like structure which is capable of intumescencd employed. As with other shaping processes, the release agents customary in industry can also be used here, for example those based on silicone, Teflon ® or boron nitride, and also starch solutions or dispersions of aluminium oxide, talc, cellulose or graphite.

In addition to the production of shaped articles, sheet-like structures according to the invention which are capable of intumescence can be employed, in particular, in the field of fire protection, specifically preventive fire protection. The material according to the invention can be employed here in the form of sheet-like coverings, wallpapers, in the form of wrappings or cut sacks, seals, sheaths, adhesive tapes and fillings as protective agents which intumesce when flamed and are usually low-smoking. In the event of a fire, penetration of the flames, heat, smoke and fire gases, for example through cable ducts, door leaves, wall elements, window joints, gaps, joints and installation conduits, is then prevented. The sheet-like structures which are capable of intumescence, are preferably produced using expandable graphite or formulations containing expandable graphite, which in particular also contain glass fibres or mineral fibres and are provided with covering layers of predominantly cellulosic fibres are particularly suitable for these purposes. These hardly burn, especially if they also additionally contain phosphates, develop little smoke and expand effectively when exposed to flames.

Using the sheet-like structures according to the invention, it is possible, for example, to line or glue roof surfaces, floors, suspended intermediate ceilings, door leaves, container walls and wall surfaces, to block wall ducts and cable bulkheads, to fill hollow spaces, to wind cables and pipelines and to f it windows, so that these are protected from fire. Smoke gas barriers for, for example, air conditioning ducts or ventilation openings can also be produced by grid-like arrangements or a loose coil through which material can flow axially, which close due to expansion when exposed to flames. Seals or joint fillings of sheet-like structures according to the invention which close due to expansion in the event of a fire are also possible. The sheet-like structures according to the invention can also be used as extinguishing blankets and for covering metal or oil fires.

If plastic pipes or thin-walled metal pipes are surrounded by coils of the sheet-like structures according to the invention and are optionally also protected by an outer shell, for example of sheet metal, such pipes are pressed against the coil area by the expansion acting inwards on exposure to flames and passage of the fire is thus prevented. As a result of the expansion of the sheet-like structures which takes place during heating or exposure to flames, they can also be used, especially if installed in several layers, to release safety switches, open or close bulkheads, and operate levers.

The invention is explained by way of examples and prototypes below. The parts and percentages stated relate to the weight, unless stated otherwise.

EXAMPLES

General

To produce the sheet-like structures which are capable of intumescence, a stitching machine customary in industry (produced by Dilo KG, Type NDLP/6D) was used, in front of the intake of which a sprinkling bench was assembled, over which a textile web (non-woven web) was fed to the machine. About 80 cm before the intake, a second textile web (non-woven web) was fed via a roll to the bench and was placed flush on top of the first web and thus introduced into the stitching unit as a double layer.

A sprinkling device was assembled over the first textile web running over the bench, with the aid of which the web running over the feed bench was sprinkled over its entire surface.

A prestitched viscose staple fibre non-woven having a weight per unit area of 100 g/m² with a titre of 1.7 dtex and a staple length of 40 mm was used as the underneath textile web (1) (textile sheet-like structure). Either the same material or a different material additionally described was used as the textile web (2) fed in from the top. The flow rate was 1.2 m/minute. Ironing was carried out on a continuously operating flattening roll at 130° C. under a pressing pressure of 3 bar over a residence time of 25 seconds.

EXAMPLE 1

Textile webs 1 and 2 were the same. 600 g/m² of a commercially available china expandable graphite ($NO_x$-$SO_x$ type, expansion capacity about 1,200% by volume at 600° C., average particle diameter 1.8 mm) were sprinkled on. After the first passage through the stitching unit, the sheet-like structure formed was turned and stitched again from the other side. The sandwich formed was then ironed and was then capable of use. It was a highly flexible and mechanically stable sheet-like structure 2.7 mm thick, from which virtually no expandable graphite trickled out on cutting.

EXAMPLE 2

The procedure was analogous to Example 1, but commercially available $SO_x$ expandable graphite of the same average particle size as in Example 1 was used. The amount sprinkled on was also increased to 1.1 kg/m².

EXAMPLE 3

40 parts of a 50% strength aminoethanol solution in water were added to 100 parts of a 50% strength solution of aluminium tris-phosphate in water, while stirring. 60 parts of the hot solution of the aluminium phosphate salt thus prepared were stirred with 70 parts of $NO_2$ expandable graphite. The slurry formed was dried and the cake thus formed was comminuted and sieved to a particle diameter of 1.8 mm. An expandable graphite coated with 30% of an aluminium phosphate binder was thus obtained. The granular material thus prepared was sprinkled in an amount of 700 g/m² onto the textile web (1), the web was stitched in a double layer with an identical textile web (2) and the structure was flattened.

EXAMPLE 4

The sheet-like structure obtained according to Example 3 was doubled on the stitching unit. After ironing, it was 5 mm thick, highly flexible and mechanically stable. On cutting, virtually no intumescence material trickled out.

EXAMPLE 5

The procedure was as in Example 3, but a glass non-woven having a weight per unit area of 300 g/m² was also placed on the textile web (1) before the sprinkling process, so that the intumescence material sprinkled on lay on the glass non-woven, which became a constituent of the sandwich middle layer after stitching analogous to Example 3. After ironing, a flexible sheet-like structure 2.8 mm thick was obtained.

EXAMPLE 6

The procedure was analogous to Example 5, but the glass non-woven was placed on the web only after the expandable graphite formulation had been sprinkled on, so that the subsequent viscose staple fibre non-woven (textile web (2)) lay on this. During stitching, which was carried out three times, a stable sheet-like structure was obtained, which, after ironing, had a thickness of 3 mm and was outstandingly suitable as an extinguishing blanket.

EXAMPLE 7

Before stitching and before being covered with the textile web (2), commercially available kaolin fibres shortened to a length of about 5 mm were first sprinkled onto the textile web (1) in an amount of 300 g/m². The expandable graphite composition also used in Example 3 was sprinkled onto this layer in an amount of 700 g/m², this was then covered with another layer of 300 g/m². Of the kaolin fibres and finally with the textile web (2) and the structure was stitched three times. A flexible, mechanically stable sheet-like structure 3.6 mm thick was obtained.

EXAMPLE 8

The procedure was analogous to Example 3, but the expandable graphite formulation (700 parts) was mixed homogeneously with short glass fibres (MG glass fibres, Bayer AG, 700 parts) before being sprinkled on and the mixture was sprinkled on in an amount of 1,400 g/m². The sheet-like structure (sandwich) obtained after double stitching and subsequent ironing was mechanically stable and flexible and had a thickness of 3.1 mm.

EXAMPLE 9

The procedure was analogous to Example 1. However, a mixture of equal parts of neutral ethylenediamine orthophosphate and expandable graphite was sprinkled on in an amount of 1,000 g/m². The stable sheet-like structure thus obtained was highly flexible and had a thickness of 2.9 mm.

EXAMPLE 10

The procedure was as in Example 5, but instead of the glass non-woven a glass fabric in a linen weave with a weight per unit area of 650 g/m² was inserted. After ironing, a sheet-like structure which was flexible but less readily deformable over its surface and was used as a fire protection covering and fire protection substrate for cableways was obtained.

EXAMPLE 11

The procedure was as in Example 3, but instead of a viscose staple fibre non-woven, a cotton woven fabric (nettle) with a weight per unit area of 200 g/m² was used as the textile web (1). After double stitching on both sides and ironing, a mechanically resistant, flexible sheet-like structure which had a good bonding strength, so that virtually no expandable graphite material trickled out on cutting, was obtained.

EXAMPLE 12

The procedure was as in Example 6, but in each case a polyamide fibre non-woven having a weight per unit area of 150 g/m² was used as the textile webs 1 and 2.

EXAMPLE 13

The procedure was as in Example 3, but a polypropylene fibre non-woven having a weight per unit area of 200 g/m² was employed as the textile web (2). The ironing temperature was reduced to 120° C.

EXAMPLE 14

The procedure was as in Example 2, but instead of the expandable graphite, a sodium silicate in the form of flakes and containing 12% of water (Portilo ® A, produced by Henkel) was used and the ironing temperature was reduced to 95° C.

EXAMPLE 15

The procedure was as in Example 14. However, the polypropylene fibre non-woven described in Example 13 was used as the textile webs 1 and 2. The ironing temperature was also reduced to 95° C.

EXAMPLE 16

The procedure was as in Example 2. However, an intimate mixture of the expandable graphite according to Example 3 (300 parts), the silicate according to Example 14 (200 parts) and the glass fibre according to Example 8 (200 parts) was employed as the intumescence material. A flexible sheet-like structure with a good bonding of the materials and good mechanical stability was obtained. On cutting, virtually no intumescence material trickled out.

EXAMPLE 17

A 50% strength solution of aluminium tris-phosphate in water was mixed intensively in an amount of 100 parts with 19 parts of ethylenediamine. The neutral salt slurry formed by this procedure was dried and the product was comminuted to particle sizes of between 0.18 and 1 mm. A free-flowing powder which intumesces when exposed to flames was obtained. This was processed analogously to Example 2 instead of the expandable graphite. A mechanically stable sandwich which had a good flexibility and can be used in the form of wrappings, sheaths or coverings to protect cables from the action of fire was obtained.

EXAMPLE 18 (TESTING OF THE INTUMESCENCE)

To test the ability to intumesce, squares each of edge length 3 cm were cut out of the sheet-like structures obtained according to Examples 1 to 17 and were placed on a stretched metal sieve of steel and introduced into a cabinet preheated to 600° C. After 30 minutes, the samples were removed from the cabinet. In all cases, the original volume of the sheet-like structure had increased by more than 100%.

EXAMPLE 19

Four layers of the sheet-like structure obtained according to Example 1 (about 34 g) were placed in a lidded box of finely perforated steel sheet 5 mm thick with internal dimensions of $10 \times 10 \times 2$ cm. The box mould was then closed and placed in an oven, which reached 600° C. in the course of one hour. The mould was then removed from the oven and cooled and the shaped article formed was removed. It still had a weight of 23 g, corresponding to a specific gravity of 0.11 g/cm$^3$. The parallelepiped thus produced had a covering layer of pyrolysed viscose staple and an indentation resistance, averaged over the area, of 9.5 kg/cm$^2$, measured using a 0.25 cm$^2$ steel measuring stamp.

EXAMPLE 20

A layer of the non-woven sandwich obtained according to Example 2 was placed in the steel mould according to Example 19. The mould was then closed and introduced into an oven preheated to 650° C. After one hour, the mould was removed from the oven, cooled and opened. A stable parallelepiped having an average specific gravity of 0.05 g/cm$^3$, the surfaces of which consisted of viscose staple pyrolysis product, was obtained. The indentation resistance, averaged over the area, was 6.5 kg/cm$^2$. Such shaped articles have a foamlike ductile character. They are suitable as soundproofing elements, can be machined, have high electrical conductivities and with exclusion of oxygen have high heat resistances of more than 2,000° C.

EXAMPLE 21

The procedure was analogous to Example 19, but two layers of the sheet-like structure from Example 3 were used. A lightweight parallelepiped having an average specific gravity of 0.055 g/cm$^3$ was obtained. This was introduced, together with a parallelepiped which had been obtained according to Example 20 and had not yet been heattreated, into an oven preheated to 700° C., air having access to the inside thereof. After 6 hours, the parallelepipeds were removed. The weight loss of the parallelepiped according to Example 20 was more than 50%, and it had virtually no further mechanical strength, while the weight loss of the parallelepiped according to Example 21, which was protected from oxidation by the binder, was only 9% and this also showed no loss in respect of volume and mechanical properties.

EXAMPLE 22

A piece of the sheet-like structure from Example 1 0.5 m$^2$ in size was heated at 260° C. for three minutes in a heating press with a separation of 3 mm between the two press plates which can be heated. The sheet-like structure which was modified in this way and was now 3 mm thick had a more textile-like handle than before and felt "fuller", without having lost flexibility. Expansion by more than 100% by volume also took place on exposure to flames.

EXAMPLE 23

A wall element into which PVC pipes of 8 cm diameter were incorporated perpendicular to the surface was installed in a test oven. The pipe connections projecting 30 cm into the oven were enclosed, immediately before the installation wall, in a 10-layered, 15 cm wide coil of the sheet-like structures produced according to Examples 1, 2, 3, 4, 7, 8, 9, 12, 13, 14, 15 and 16, the last layer in each case being protected by a collar of 1 mm sheet steel.

The test oven constructed and operated in accordance with DIN 4102 was fired in accordance with the standard temperature curve. After an operating time of 30 minutes, all the PVC pipes had been pressed together due to the expansion of the coil positioned on the flame side and had become impermeable to the flame gases.

EXAMPLE 24

Steel pipes coiled several times in an S-shaped manner (wall thickness 3 mm, external diameter 4 cm) were each covered with a pipe having an internal diameter of, 1.5 cm (internal width) which had been cut and tailored from sheet-like structures according to the preceding examples. The sheet-like structures from Examples 2, 5, 6, 7, 8, 9, 12, 13, 14, 15 and 16 were used in single-layer form. The sheet-like structure from Example 1 was used in two-layer form, and the sheet-like structure from Example 3 was used both in single-layer and in two-layer form. The pipes were then surrounded by a protective collar of sheet steel 0.2 mm thick at a distance of 1.5 cm and the structure thus obtained was heated at 500° C. for 30 minutes. A locking join was then produced between the steel pipe and the outer protective collar by the expanded product formed, without shrink holes or hollow spaces occurring in the bonded piece.

The casings thus produced have soundproofing properties and remove the heat of the internal pipe in a slower manner (about 5–15 W/K m), which is desirable for exhaust pipes.

EXAMPLE 25

1 m long and 20 cm wide strips of sheet-like structures obtained according to Examples 2 and 3 were in each case soaked to saturation on one of the two surfaces with a commercially available thermosetting epoxy resin mixture. The strips were then placed in a mould, lined with aluminium foil, for a pipe semi-cylindrical shell 1 m long and 1 cm thick. The mould was closed and then heated at 300° C. for 5 minutes. It was then cooled and the resulting moulding laminated with aluminium film was removed from the mould. After removal of the aluminium foil, lightweight shaped shells having a specific gravity of less than 0.9 g/cm$^3$, one surface of which consisted of a fibre-reinforced epoxy resin layer which imparted good mechanical strength, were present. In contrast, the inner surface which had not been impregnated with epoxy resin had a ductile character. These semi-cylindrical shells can be used as fire protection and insulating elements for pipelines, and for the production of cable conduits. When exposed to flames, the material still proved to be expandable, that is to say capable of intumescence, in the direction of the centre of the circle of its section, and was thus able to protect cable lying inside against access by flames and further improve the insulating actions.

EXAMPLE 26

The procedure was as in Example 25, but a hardening temperature of 680° C. was chosen and all the sheet-like structures according to Examples 1–10 were employed. The oven temperature (680° C.) was reached in the course of 40 minutes and maintained for 10 minutes. The product was then cooled and removed from the mould. In all cases, a stable pipe semi-cylindrical shell having a specific gravity of less than 0.9 g/cm$^3$ and a hard mechanically stable surface layer where the synthetic resin impregnation had previously been was obtained. No further expansion took place on exposure to flames.

EXAMPLE 27

A sheet of commercially available polyphenylene sulphide (thickness 3 mm) was first placed in the mould according to Example 20, a sheet-like structure obtained according to Example 16 was then cut and placed in the mould, and an identical polyphenylene sulphide sheet was again placed in the mould. The mould was now closed and heated to 360° C. in an oven. When the temperature had been reached, the mould was removed from the oven. After cooling, a lightweight sandwich parallelepiped with polyphenylene sulphide covering layers was obtained. Such composite materials can be used in the construction of housings, loudspeaker boxes and vehicle bodies.

EXAMPLE 28

The procedure was as in Example 27, but instead of polyphenylene sulphide, sheets of polypropylene were used, a sheet-like structure obtained according to Example 14 was employed and heating was carried out only up to 250° C. An insulating hard sandwich with polypropylene covering layers and a core material of expanded silicate was obtained.

EXAMPLE 29

Continuous joints 2 cm wide and 55 cm deep were milled into the 15 cm thick wall element of a test oven according to Example 23, as well as circular holes of 10 cm diameter and slots 20×100 cm wide. These masonry breakthroughs were closed with sheet-like material from Examples 3, 5, 6, 7 and 8 as follows: The circular holes were filled and closed by 10 cm thick and 10 cm wide coils of the sandwich webs. The joints were closed by sections of the sheet-like structures folded or rolled several times, and the slots were blocked as homogeneously as possible by sandwich material crumpled like, for example, newspaper with no specific order, this being secured against falling out by a piece of stretched metal grid positioned on the outside. In a fire test in which firing was carried out using the standard temperature curve in accordance with DIN 4102, all the openings were closed even after a burning time of 3 hours.

EXAMPLE 30

The procedure was as in Example 1, but instead of expandable graphite, a commercially available, vermiculite (thermally expandable mica) of average largest particle diameter of 3 mm was used.

The non-woven sandwich obtained was mechanically stable, only insignificant intumescence material trickled out at the cut points, and the structure was completely flexible and could be rolled and folded; on exposure to flame, it foamed vigorously.

A strip of the sandwich forced U-shaped into a 1 cm wide joint between two concrete plates closed the joint on exposure to flames.

EXAMPLE 31

The procedure was as in Example 1, but instead of the expandable graphite a mixture of equal parts of the expandable graphite and the vermiculite used in Example 30 was used. The resulting flexible sandwich material could be used for fire protection purposes analogously to Example 30 and for the production of shaped articles analogously to Example 20.

EXAMPLE 32

100 parts of a 50% strength solution of a reaction product of one mol of aluminium hydroxide with three mols of $H_3PO_4$ in water were neutralised with 38 parts of ethanolamine. The water was then removed in vacuo at 80° C. 30 parts of the highly viscous material thus obtained, which is capable of intumescence, were needed at 80° C. with 70 parts of the vermiculite used in Example 30. After cooling to 22° C., this gave a material mixture which was capable of being sprinkled and in which the vermiculite was coated with the binder. This material was processed to a non-woven sandwich analogously to Example 1 with an amount deposited of 1000 g/m$^2$.

This sandwich could be used analogously to Example 30 for fire protection purposes and analogously to Example 20 for production of mouldings.

What is claimed is:
1. A flexible sheet-like structure comprising
   a) a first textile sheet,
   b) a layer of expandable graphite on said first sheet,
   c) a second textile sheet on said layer of expandable graphite, and
   d) stitching extending from said first to said second sheet, thereby locking the layer of expandable graphite into the structure.

* * * * *